United States Patent
Fujimura et al.

(10) Patent No.: US 11,165,567 B2
(45) Date of Patent: Nov. 2, 2021

(54) PERMISSION INFORMATION MANAGEMENT SYSTEM, AND PERMISSION INFORMATION MANAGEMENT METHOD

(71) Applicant: Nippon Telegraph and Telephone Corporation, Tokyo (JP)

(72) Inventors: Shigeru Fujimura, Yokosuka (JP); Akihito Akutsu, Yokosuka (JP); Tomokazu Yamada, Yokosuka (JP); Atsushi Nakadaira, Yokosuka (JP); Junichi Kishigami, Muroran (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 761 days.

(21) Appl. No.: 15/754,665

(22) PCT Filed: Aug. 19, 2016

(86) PCT No.: PCT/JP2016/074244
§ 371 (c)(1),
(2) Date: Feb. 23, 2018

(87) PCT Pub. No.: WO2017/038507
PCT Pub. Date: Mar. 9, 2017

(65) Prior Publication Data
US 2018/0241551 A1    Aug. 23, 2018

(30) Foreign Application Priority Data
Sep. 3, 2015  (JP) .............................. JP2015-173710

(51) Int. Cl.
*H04L 9/14*        (2006.01)
*G06F 21/00*       (2013.01)
(Continued)

(52) U.S. Cl.
CPC ............ *H04L 9/0825* (2013.01); *G06F 16/27* (2019.01); *G06F 21/10* (2013.01); *G06F 21/60* (2013.01);
(Continued)

(58) Field of Classification Search
CPC ... H04L 9/14; H04L 9/30; H04L 63/08; H04L 63/10; H04L 63/12; H04L 63/20;
(Continued)

(56) References Cited

U.S. PATENT DOCUMENTS

2010/0189265 A1*  7/2010  Ito .......................... H04L 9/3265
                                                                         380/285
2013/0232339 A1   9/2013  Ignatchenko et al.
(Continued)

FOREIGN PATENT DOCUMENTS

JP     2003-298565 A    10/2003
JP     2007-235471 A     9/2007

OTHER PUBLICATIONS

Office Action, European Patent Application No. 16841539.6, dated Oct. 16, 2019, 6 pages.
(Continued)

*Primary Examiner* — Jeffrey Nickerson
*Assistant Examiner* — Kalish K Bell
(74) *Attorney, Agent, or Firm* — Kilpatrick Townsend & Stockton LLP

(57) ABSTRACT

A user terminal generates a first key pair and a second key pair, transmits a permission request including a public encryption key of the second key pair after electronically signing the permission request with a secret encryption key, and acquires, from permission information transmitted from a right-holder terminal, a content decryption key by using a secret decryption key of the second key pair and uses the content. The right-holder terminal stores a third key pair and
(Continued)

the content decryption key, verifies the permission request received, and encrypts the content decryption key by using the public encryption key of the second key pair included in the permission request and transmits the permission information including the encrypted content decryption key after electronically signing the permission information with a secret encryption key of the third key pair. The permission request and the permission information are transmitted and received via a blockchain.

4 Claims, 5 Drawing Sheets

(51) Int. Cl.
*G06F 21/10* (2013.01)
*G06F 21/64* (2013.01)
*G06F 21/72* (2013.01)
*H04L 9/08* (2006.01)
*G06F 16/27* (2019.01)
*G06F 21/60* (2013.01)
*H04L 29/06* (2006.01)
*H04L 9/32* (2006.01)
*G06Q 20/06* (2012.01)
*H04L 9/06* (2006.01)

(52) U.S. Cl.
CPC ........... *G06F 21/64* (2013.01); *G06Q 20/065* (2013.01); *H04L 9/0637* (2013.01); *H04L 9/3236* (2013.01); *H04L 9/3247* (2013.01); *H04L 63/061* (2013.01); *H04L 63/062* (2013.01); *G06F 2221/07* (2013.01); *H04L 2209/38* (2013.01); *H04L 2209/60* (2013.01); *H04L 2463/101* (2013.01)

(58) Field of Classification Search
CPC ......... H04L 65/60; H04L 67/06; H04L 67/10; G06F 21/00; G06F 21/10; G06F 21/64; G06F 21/72
See application file for complete search history.

(56) References Cited

U.S. PATENT DOCUMENTS

| | | | |
|---|---|---|---|
| 2013/0275755 A1* | 10/2013 | Ignatchenko | ....... H04L 63/0428 713/168 |
| 2015/0120567 A1 | 4/2015 | Van Rooyen et al. | |
| 2015/0127940 A1 | 5/2015 | Polehn et al. | |
| 2017/0134765 A1* | 5/2017 | Uhr | .................... H04N 21/4627 |

OTHER PUBLICATIONS

Nakamoto, Bitcoin: A Peer-to-Peer Electronic Cash System, https://bitcoin.org/bitcoin.pdf (retrieved Jan. 25, 2019) Oct. 31, 2008, pp. 1-9.
Supplementary European Search Report, European Patent Application No. 16841539.6, dated Feb. 4, 2019.
Office Action, Japanese Patent Application No. 2015-173710, dated Aug. 9, 2018.
International Search Report, PCT Application No. PCT/JP2016/074244, dated Oct. 11, 2016.
Written Opinion, PCT Application No. PCT/JP2016/074244, dated Oct. 11, 2016.
Saito, "Bitcoin: Digital Megalithic Currency Without Human Intervention", WIDE Technical-Report in 2013, WIDE Project, Dec. 31, 2013.
Akutsu, et al., "User o Kando saseru Epoch-making na Service Soshutsu eno Chose Kyogi no Kando o Sekaiju de Kyoyu dekiru Service ni Muketa Gijutsu Kaihatsu", NTT Gijutsu Journal, May 1, 2015, vol. 27, No. 5, pp. 10-14.
International Preliminary Report on Patentability, PCT Application No. PCT/JP2016/074244, dated Mar. 15, 2018.

* cited by examiner

FIG. 3

PERMISSION REQUEST (1) RIGHT HOLDER'S PUBLIC DECRYPTION KEY (FOR ELECTRONIC SIGNATURE):
MDQwDQYJKoZ...

(2) HASH VALUE OF PREVIOUS TRANSACTION INVOLVING DIGITAL VIRTUAL CURRENCY TO BE PAID:
125AEADF27B0459B87...

(3) AMOUNT OF DIGITAL VIRTUAL CURRENCY PAID:
0.050

(4) ID OF CONTENT FOR WHICH PERMISSION IS REQUESTED:
C8E0AB73702A57FAAEF...

(5) USER'S PUBLIC ENCRYPTION KEY:
MIGrAgEAAiEAv...

HASH VALUE OF ABOVE DATA

ENCRYPTED WITH USER'S SECRET ENCRYPTION KEY (ELECTRONIC SIGNATURE)

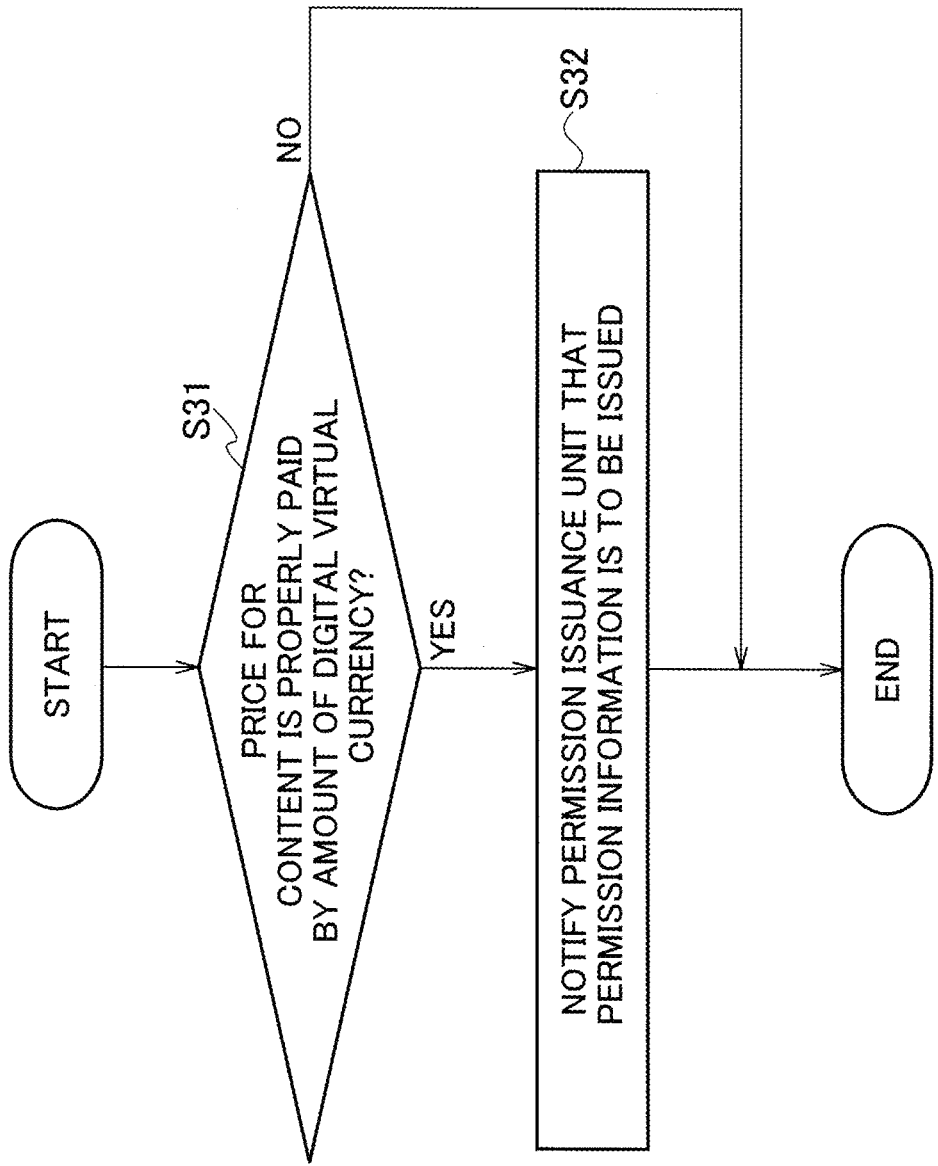

FIG. 5

PERMISSION INFORMATION (1) USER'S PUBLIC DECRYPTION KEY (FOR ELECTRONIC SIGNATURE):
AAAAB3NzaC1y...

(2) HASH VALUE OF PERMISSION REQUEST CONCERNED:
68B3CBF3876E57AB23...

(3) ID OF CONTENT FOR WHICH PERMISSION IS GRANTED:
C8E0AB73702A57FAAEF...

(4) CONTENT DECRYPTION KEY ENCRYPTED WITH USER'S PUBLIC ENCRYPTION KEY:
(BINARY DATA)

HASH VALUE OF ABOVE DATA  ENCRYPTED WITH RIGHT HOLDER'S SECRET ENCRYPTION KEY (ELECTRONIC SIGNATURE)

PERMISSION INFORMATION MANAGEMENT SYSTEM, AND PERMISSION INFORMATION MANAGEMENT METHOD

This application is a national stage application of PCT/JP2016/074244, which claims priority to Japanese Application No. 2015-173710, both of which are incorporated herein by reference.

TECHNICAL FIELD

The present invention relates to a technique for managing permission information related to digital contents such as images and sounds.

BACKGROUND ART

An electronic signature is one of techniques for guaranteeing the source of information. Presently, the most widespread mechanism for implementing electronic signatures is based on public-key encryption. In this regard, a reliable third-party body is usually used to certify that an electronic key used for electronically-signed information is the key of the source of the information. Credibility is assured when a reliable third-party body performs centralized management to link an individual with information on the key used by the individual.

Meanwhile, a mechanism that can assure credibility without needing such centralized management is starting to be widespread mainly for digital virtual currency. This mechanism is called blockchain and maintains soundness of the entire system by assuring credibility of exchanged information using an agreement formation process in a network formed by all the participants and by giving higher incentives for legitimate acts than for illicit acts (Non-patent document 1).

PRIOR ART DOCUMENT

Non-Patent Document

Non-patent document 1: Kenji Saito, "Bitcoin: Digital Megalithic Currency Without Human Intervention", WIDE Technical Report

SUMMARY OF THE INVENTION

Problem to be Solved by the Invention

In the blockchain for digital virtual currency, information pieces on virtual currency transactions between participants are bundled into a unit called a block, and blocks form the blockchain. The blockchain has a structure such that a block is recorded by being linked to an immediately previous block as its name "chain" suggests. Specifically, a block is linked to an immediately previous block by having the hash value of the immediately previous block included therein. Thus, falsifying transaction information contained in a block at a certain time changes the hash value of that block, and therefore requires falsification of all the blocks following that block. To add a block, it is necessary to execute processing (mining) that involves enormous computational effort in order to find additional information (nonce) that, by being added to the block, causes the hash value of the block to match a particular condition. Thus, it can be said that blockchain is a mechanism extremely robust against falsification. In digital virtual currency, this blockchain corresponds to a ledger that records all the transactions of virtual currency. A transaction of virtual currency can meet credibility requirements by using the blockchain.

Focusing on the fact that the blockchain mechanism is extremely robust against falsification, let us consider applying the blockchain to management of permissions for digital contents. In management of permissions for digital contents, permission information is assumed to be included in the blockchain, as transaction information in virtual currency is. Meanwhile, the issue to be addressed is how the actual data of digital contents themselves should be handled. In terms of data size, digital contents are considered to be far larger than transactional information in virtual currency. The idea of storing the actual data of the digital contents in the blockchain as well is not rational since it bloats the data size of the blockchain itself.

The present invention has been made in view of the above problem, and aims to provide a technique for applying a blockchain used for transactions of digital virtual currency to management of permissions for contents.

Means for Solving the Problem

To solve the above problem, a first aspect of the present invention is summarized as a permission information management system including a user terminal of a user of a content and a right-holder terminal of a right holder of the content, in which the user terminal includes: a key generation unit that generates a first key pair for an electronic signature including a secret encryption key and a public decryption key and a second key pair including a secret decryption key and a public encryption key; a permission request unit that transmits a permission request including the public encryption key of the second key pair after electronically signing the permission request with the secret encryption key of the first key pair; and a content use unit that acquires, from permission information transmitted from the right-holder terminal, a content decryption key by using the secret decryption key of the second key pair, and uses the content by using the content decryption key, the right-holder terminal includes: a key management unit that stores therein a third key pair for an electronic signature including a secret encryption key and a public decryption key, and the content decryption key for decryption of the content; a permission verification unit that verifies whether the permission request received from the user terminal satisfies a permission condition for the content; and a permission issuance unit that, when the permission request satisfies the permission condition, encrypts the content decryption key by using the public encryption key of the second key pair included in the permission request and transmits the permission information including the encrypted content decryption key after electronically signing the permission information with the secret encryption key of the third key pair, and the permission request and the permission information are transmitted and received via a blockchain.

A second aspect of the present invention is summarized as a user terminal of a user of a content, including: a key generation unit that generates a first key pair for an electronic signature including a secret encryption key and a public decryption key and a second key pair including a secret decryption key and a public encryption key; a permission request unit that transmits a permission request including the public encryption key of the second key pair to a right-holder terminal of a right holder of the content after electronically signing the permission request with the secret encryption key of the first key pair; and a content use unit that acquires, from permission information received from the right-holder terminal, a content decryption key by using the secret decryption key of the second key pair, and uses the content by using the content decryption key, in which the permission request and the permission information are transmitted and received via a blockchain.

A third aspect of the present invention is summarized as a right-holder terminal of a right holder of a content, including: a key management unit that stores therein a key pair for an electronic signature including a secret encryption key and a public decryption key and the content decryption key for decryption of the content; a permission verification unit that verifies whether a permission request received from a user terminal of a user of the content satisfies a permission condition for the content; and a permission issuance unit that, when the permission request satisfies the permission condition, encrypts the content decryption key by using a public encryption key included in the permission request, and transmits permission information including the encrypted content decryption key to the user terminal after electronically signing the permission information with the secret encryption key of the key pair, in which the permission request and the permission information are transmitted and received via a blockchain.

A fourth aspect of the present invention is summarized as a permission information management method performed by a permission information management system including a user terminal of a user of a content and a right-holder terminal of a right holder of the content, the method including: causing the user terminal to generate a first key pair for an electronic signature including a secret encryption key and a public decryption key and a second key pair including a secret decryption key and a public encryption key, transmit a permission request including the public encryption key of the second key pair after electronically signing the permission request with the secret encryption key of the first key pair, and acquire, from permission information transmitted from the right-holder terminal, a content decryption key by using the secret decryption key of the second key pair, and use the content by using the content decryption key; and causing the right-holder terminal, which includes a key management unit that stores therein a third key pair for an electronic signature including a secret encryption key and a public decryption key and the content decryption key for decryption of the content, to verify whether the permission request received from the user terminal satisfies a permission condition for the content, and when the permission request satisfies the permission condition, encrypt the content decryption key by using the public encryption key of the second key pair included in the permission request and transmit the permission information including the encrypted content decryption key after electronically signing the permission information with the secret encryption key of the third key pair, in which the permission request and the permission information are transmitted and received via a blockchain.

A fifth aspect of the present invention is summarized as a permission information management method performed by a user terminal of a user of a content, including generating a first key pair for an electronic signature including a secret encryption key and a public decryption key and a second key pair including a secret decryption key and a public encryption key; transmitting a permission request including the public encryption key of the second key pair to a right-holder terminal of a right holder of the content after electronically signing the permission request with the secret encryption key of the first key pair; and acquiring, from permission information received from the right-holder terminal, a content decryption key by using the secret decryption key of the second key pair, and using the content by using the content decryption key, in which the permission request and the permission information are transmitted and received via a blockchain.

A sixth aspect of the present invention is summarized as a permission information management method performed by a right-holder terminal of a right holder of a content, the right-holder terminal including a key management unit that stores therein a key pair for an electronic signature including a secret encryption key and a public decryption key and a content decryption key for decryption of the content, the method including: verifying whether a permission request received from a user terminal of a user of the content satisfies a permission condition for the content; and when the permission request satisfies the permission condition, encrypting the content decryption key by using a public encryption key included in the permission request and transmitting permission information including the encrypted content decryption key after electronically signing the permission information with the secret encryption key of the key pair, in which the permission request and the permission information are transmitted and received via a blockchain.

A seventh aspect of the present invention is summarized as a permission information management program that causes a computer to function as the user terminal.

An eighth aspect of the present invention is summarized as a permission information management program that causes a computer to function as the right-holder terminal.

Effect of the Invention

The present invention can provide a technique for applying a blockchain used for transactions of digital virtual currency to management of permissions for contents.

BRIEF DESCRIPTION OF THE DRAWINGS

FIG. 3 is a diagram illustrating an example of a permission request.

FIG. 4 is a flowchart illustrating an example of determination processing performed by a permission verification unit.

FIG. 5 is a diagram illustrating an example of permission information.

MODE FOR CARRYING OUT THE INVENTION

An embodiment of the present invention is described below with reference to the drawings.

Figure 1:
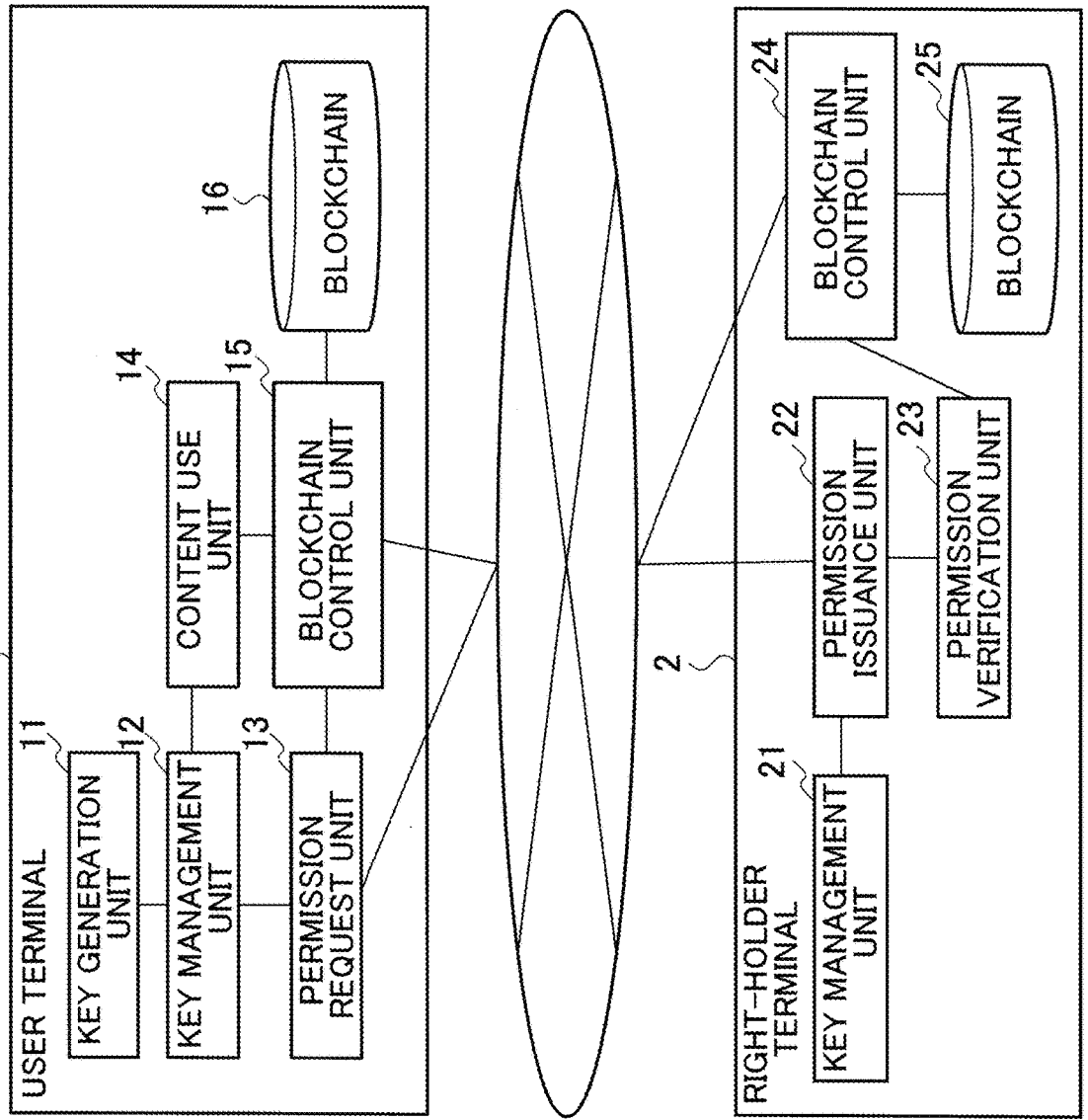
FIG. 1 is a diagram illustrating the overall configuration of a permission information management system according to an embodiment of the present invention.

FIG. 1 is a diagram illustrating the configuration of a permission information management system according to the present invention. The permission information management system illustrated in FIG. 1 includes a user terminal 1 and a right-holder terminal 2.

First, the configuration of the user terminal 1 is described. The user terminal 1 illustrated in FIG. 1 includes a key generation unit 11, a key management unit 12, a permission request unit 13, a content use unit 14, a blockchain control unit 15, and a blockchain 16.

The key generation unit 11 generates two key pairs, each including an encryption key and a decryption key, using a public-key encryption algorithm. Specifically, the key generation unit 11 generates a first key pair for an electronic signature including a secret encryption key and a public decryption key and a second key pair including a secret decryption key and a public encryption key. The second key pair is a public encryption key and a secret decryption key which are used for changing permission information received from the right-holder terminal 2 into a format readable only by the user terminal 1 (user). An example of a usable public-key encryption algorithm is, but not limited to, RSA encryption.

The key management unit 12 is a storage unit that stores therein the first key pair and the second key pair generated by the key generation unit 11, and manages these key pairs securely.

The permission request unit 13 transmits a permission request including the public encryption key of the second key pair after electronically signing the permission request with the secret encryption key of the first key pair. Specifically, the permission request unit 13 generates a permission request for a content using the first key pair and the second key pair stored in the key management unit 12 and information on digital virtual currency held in itself, and transmits the permission request by broadcasting the permission request to the entire network.

The permission request unit 13 may acquire the information on digital virtual currency from the blockchain 16 held in itself via the blockchain control unit 15, or may acquire information on digital virtual currency held in a storage unit (not shown) such as memory.

The content use unit 14 acquires a content decryption key from permission information transmitted from the right-holder terminal 2 by using the secret decryption key of the second key pair, and uses the content by using the content decryption key. Note that it is assumed here that the content is encrypted, and an example of a usable encryption method and algorithm is, but not limited to, AES encryption of common-key cryptography.

Specifically, when permission information is issued by the right-holder terminal 2 by broadcasting and is stored in the blockchain 16, the content use unit 14 acquires the permission information via the blockchain control unit 15. The content use unit 14 then decrypts an encrypted content decryption key by using the secret decryption key of the second key pair stored in the key management unit 12. The content use unit 14 then uses the decrypted content decryption key to decrypt encrypted content acquired beforehand, and thereby makes the content usable. Use of content herein may mean, for example, playing back a content or editing a content, and a content may be used appropriately in a utilization manner suitable for the content.

The blockchain control unit 15 transmits and receives a permission request transmitted by the permission request unit 13 and permission information transmitted by the right-holder terminal 2 via the blockchain. Specifically, as in the case of digital virtual currency, the blockchain control unit 15 maintains the system of the blockchain in cooperation with other terminals in an autonomous distributed manner. These other terminals are terminals having a blockchain control unit and the blockchain. Although FIG. 1 illustrates only the user terminal 1 and the right-holder terminal 2 by way of example, a plurality of other terminals each having the blockchain control unit and the blockchain exist in the network.

The blockchain 16 stores therein the latest blockchain in almost real time by loosely synchronizing with all the other terminals having the blockchain via the blockchain control unit 15. When a block (pieces of information, such as transactional information like a permission request and permission information, bundled at certain time intervals) which is newer than the latest block in the blockchain stored in the blockchain 16 is acquired via the blockchain control unit 15, the blockchain is updated after verification is made as to whether the new block is qualified to be added to the current blockchain.

Next, the configuration of the right-holder terminal 2 is described. The right-holder terminal 2 shown includes a key management unit 21, a permission issuance unit 22, a permission verification unit 23, a blockchain control unit 24, and a blockchain 25. Being the same as those of the user terminal 1, the blockchain control unit 24 and the blockchain 25 are not described.

The key management unit 21 is a storage unit that stores therein a third key pair for an electronic signature including a secret encryption key and a public decryption key, and a content decryption key for decryption of a content. The key management unit 21 manages these keys securely.

The permission verification unit 23 verifies whether a permission request received from the user terminal 1 satisfies a permission condition for the content concerned. Specifically, the permission verification unit 23 verifies whether the permission request transmitted from the user terminal 1 and stored in the blockchain 25 matches a predetermined condition determined by the right-holder terminal 2 beforehand, and determines whether to issue a permission.

When the permission request satisfies a permission condition, the permission issuance unit 22 encrypts a content decryption key by using the public encryption key of the second key pair included in the permission request, and transmits permission information including the encrypted content decryption key after electronically signing the permission information with the secret encryption key of the third key pair. In other words, when the permission verification unit 23 approves issuance of a permission, the permission issuance unit 22 issues permission information by using the right-holder's third key pair for an electronic signature and the content decryption key acquired from the key management unit 21 and by broadcasting the permission information to the entire network.

Now, a description is given of why, in the permission information management system illustrated in FIG. 1, the user terminal 1 includes the key generation unit 11, and the right-holder terminal 2 includes no key generation unit. In a situation of requesting a permission to use a content, users usually request for use of all different kinds of contents, and therefore it is desirable to use a different key pair for each request to increase security. On the other hand, as for the right-holder's end giving a permission for a content, it is important that the user knows that the right holder is the owner of the content, i.e., uniqueness. Thus, in terms of uniqueness, it is irrational to use a different electronic-signature key pair each time.

In view of the above points, it is deemed sufficient if the key management unit 21 of the right-holder terminal 2 securely manages the pre-generated third key pair for an electronic signature and the content decryption key for a content which circulates in an encrypted form. It is naturally possible that the right holder owns a plurality of contents. In such a case, the key management unit 21 manages keys using, for example, a table in which content IDs and corresponding content decryption keys are associated with each other.

Each of the user terminal 1 and the right-holder terminal described above may be implemented using, for example, a general-purpose computer system including a CPU, memory, an external storage device such as a hard disk, an input device, and an output device. In this computer system, the functions of each device are implemented when the CPU executes predetermined programs loaded onto the memory. For example, the functions of the user terminal 1 are implemented when the CPU of the user terminal 1 executes programs for the user terminal 1, and the functions of the right-holder terminal 2 are implemented when the CPU of the right-holder terminal 2 executes programs for the right-holder terminal 2. The programs for the user terminal 1 and the programs for the right-holder terminal 2 may be stored in a computer-readable recording medium such as a hard disk, a flexible disk, a CD-ROM, an MO, or a DVD-ROM, or may be distributed over the network.

Next, the operation of the permission information management system of the present embodiment is described.

Figure 2:
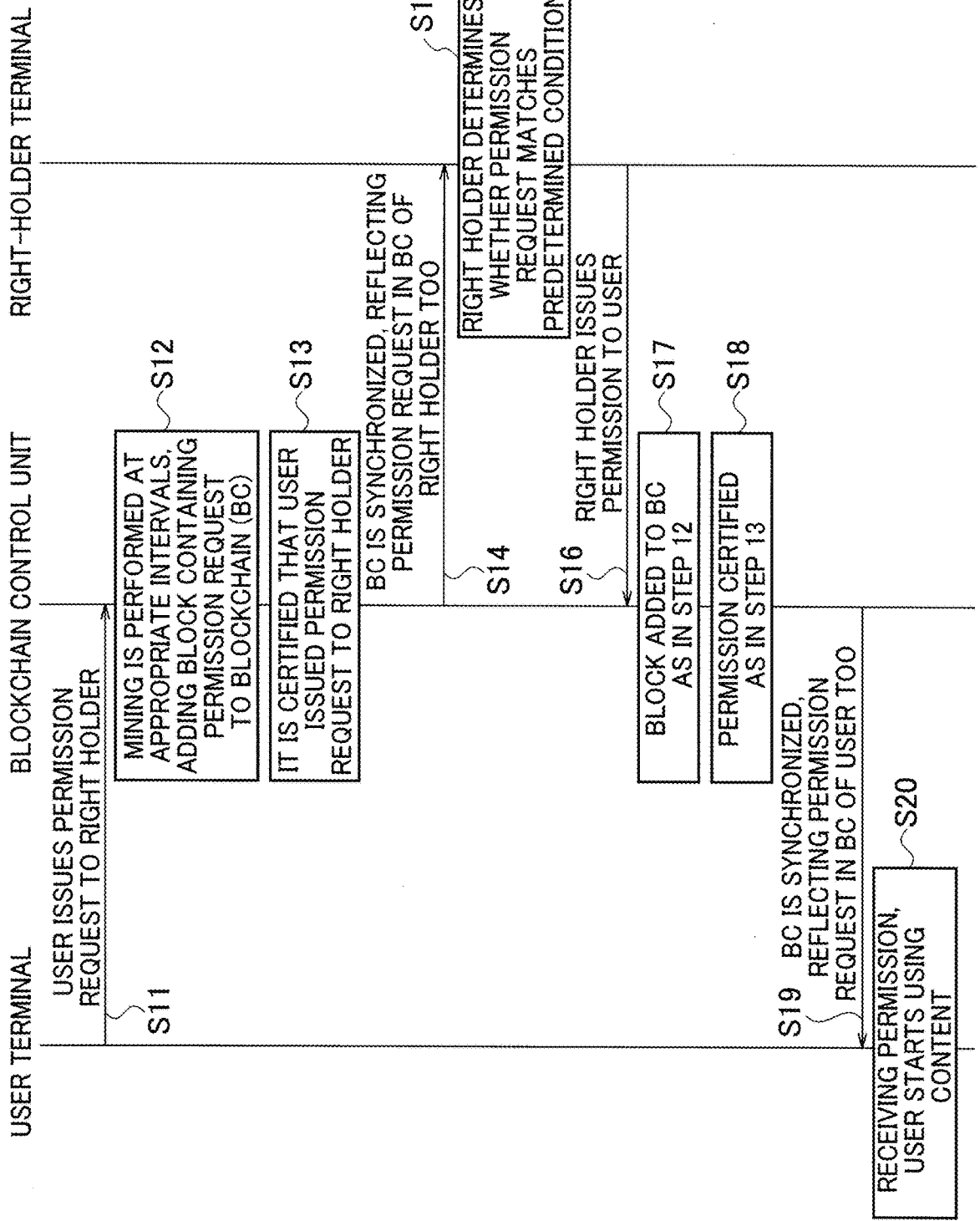
FIG. 2 is a sequence diagram illustrating the operation of the permission information management system of the present embodiment.

FIG. 2 is a sequence diagram illustrating the operation of the permission information management system of the present embodiment.

First, the permission request unit 13 of the user terminal 1 generates and issues a permission request requesting for a permission to use a content (S11). Specifically, the permission request unit 13 transmits the permission request to all the terminals, including the right-holder terminal 2, by broadcasting the permission request to the network using the blockchain control unit 15.

FIG. 3 is a diagram illustrating an example of a permission request. The permission request shown contains information forming a transaction of digital virtual currency of Non-patent document 1, i.e., (1) the public decryption key of a right holder (receiver of currency) (the public decryption key of the third key pair), (2) the hash value of the previous transaction, and (3) digital virtual currency paid. The permission request shown further contains (4) the ID of a content for which a permission is being requested and (5) the public encryption key of the requesting user.

(1) The public decryption key of the right holder is made publicly available on the network beforehand as the destination of a permission request for a content as a permission target. (4) The content ID is also made publicly available on the network beforehand in association with (1) the public decryption key of the right holder. The permission request unit 13 acquires, using the blockchain control unit 15, (1) the public decryption key of the right holder and (4) the content ID which are publicly available on the network, and sets them in the permission request.

(2) The hash value of the previous transaction is a hash value indicating the content of the (immediately) previous transaction and assuring that the digital virtual currency to be paid really belongs to the payer (the user in this case). The permission request unit 13 acquires, using the blockchain control unit 15, the hash value of the previous transaction from the blockchain 16 held in itself, and sets the hash value in the permission request.

(5) The public encryption key of the requesting user is the public encryption key of the second key pair stored in the key management unit 12. The right-holder terminal 2 uses this encryption key to encrypt a content decryption key. The permission request unit 13 acquires the public encryption key of the second key pair from the key management unit 12 and sets this public encryption key in the permission request.

Also, the permission request shown is given an electronical signature of the user. Specifically, the permission request unit 13 generates a hash value of the data containing (1) to (5) described above. The permission request unit 13 then encrypts the hash value by using the secret encryption key of the first key pair stored in the key management unit 12 and thereby gives an electronic signature.

Next, as in the mechanism of the operation of the blockchain in digital virtual currency, the permission request transmitted in S11 is bundled into a single block together with transactional information such as other permission requests issued within a predetermined period of time, and this block is added to the blockchain after being subjected to nonce mining (S12). It is thereby confirmed (approved) that the user terminal 1 has issued the permission request to the right-holder terminal 2 (S13). Note that S12 and S13 are processing performed by the blockchain control unit of any terminal which succeeds at nonce mining the fastest among all the terminals including the blockchain control unit.

By loose synchronization among the terminals, the block containing this permission request is reflected in the blockchains in all the terminals, including the right-holder terminal 2 (S14). Specifically, the blockchain control unit of every terminal adds the block containing the permission request to the blockchain held in itself.

In the right-holder terminal 2, when the block containing the permission request directed thereto is added to the blockchain 25 after the blockchain synchronization in S14, the permission verification unit 23 verifies the electronic signature on the permission request by using the public decryption key of the user (the public decryption key of the first key pair). Note that the permission verification unit 23 acquires, using the blockchain control unit 24, the public decryption key of the user publicly available on the network.

After successfully verifying the electronic signature, the permission verification unit 23 determines whether to issue a permission for use of its content (S15). In other words, the permission verification unit 23 verifies whether the permission request received from the user terminal 1 satisfies a permission condition for the content.

FIG. 4 is a flowchart illustrating an example of the determination processing in S15 performed by the permission verification unit 23. The permission verification unit 23 determines whether the price for the content is properly paid by the amount of digital virtual currency in the permission request, i.e., satisfies a predetermined condition or not (S31). Specifically, the permission verification unit 23 determines whether to issue a permission based on whether the amount predetermined as the price for the content is paid in the permission request.

If the amount is proper (or satisfies the permission condition), the permission verification unit 23 notifies the permission issuance unit 22 that permission information is to be issued (S32). If the amount is not proper, the permission verification unit 23 ends the processing. Alternatively, if the amount is not proper (or does not satisfy the permission condition), the permission verification unit 23 may notify the permission issuance unit 22 that permission information is not to be issued.

In addition, after checking the price for the content but before notifying the permission issuance unit 22 whether permission information can or cannot be issued, the permission verification unit 23 may use a pre-created blacklist or whitelist to determine whether to issue a permission based on the user's credibility.

Once the permission verification unit 23 determines that the permission information is to be issued, the permission issuance unit 22 generates and issues permission information (S16). Specifically, the permission issuance unit 22 transmits the permission information to all the terminals including the user terminal 1 by broadcasting the permission information to the network using the blockchain control unit 24.

FIG. 5 is a diagram illustrating an example of permission information. The permission information shown contains (1) the public decryption key of the user (the public decryption key of the first key pair), (2) the hash value of the permission request, (3) the ID of the content for which a permission is to be issued, and (4) a content decryption key encrypted with the public encryption key of the user.

(1) The public decryption key of the user identifies the party to issue a permission to, and is made publicly available on the network beforehand as the destination of permission information. The permission issuance unit 22 acquires, using the blockchain control unit 24, the public decryption key of the user publicly available on the network, and sets this public decryption key in the permission information.

(2) The hash value of the permission request identifies the permission request for which the permission information is issued. The permission issuance unit 22 acquires the hash value included in the permission request and sets the hash value in the permission information. Similarly, the permission issuance unit 22 acquires the content ID included in the permission request and sets the ID in the permission information as (3) the ID of the content for which a permission is issued.

As to (4) the content decryption key, the permission issuance unit 22 acquires a content decryption key from the key management unit 21. The permission issuance unit 22 then encrypts the acquired content decryption key by using the public encryption key of the requesting user (the public encryption key of the second key pair) included in the permission request, and sets the encrypted content decryption key in the permission information.

Also, the permission information shown is given an electronical signature of the right holder. Specifically, the permission issuance unit 22 generates a hash value of the data containing (1) to (4) described above. The permission issuance unit 22 then encrypts the hash value by using the secret encryption key of the third key pair stored in the key management unit 21 and thereby gives an electronic signature.

Next, by processing similar to S12 to S14, the permission information transmitted in S16 is added to the blockchain (S17), and it is thereby confirmed (approved) that the right-holder terminal 2 has granted the user terminal 1 a permission to use the content (S18). Then, by loose synchronization among the terminals, the block containing this permission information is reflected in the blockchain in every terminal, including the user terminal 1 (S19). Specifically, the blockchain control unit of every terminal adds the block containing the permission information to the blockchain held in itself.

In the user terminal 1, when the block containing the permission information directed thereto is added to the blockchain 16 after the blockchain synchronization in S19, the content use unit 14 verifies the electronic signature on the permission information by using the public decryption key of the right holder (the public decryption key of the third key pair). Note that the content use unit 14 acquires, using the blockchain control unit 15, the public decryption key of the right holder publicly available on the network.

After successfully verifying the electronic signature, the content use unit 14 acquires the encrypted content decryption key from the permission information acquired via the blockchain control unit 15. The content use unit 14 then decrypts the encrypted content decryption key by using the secret decryption key of the second key pair stored in the key management unit 12. The content use unit 14 then decrypts the encrypted content by using the decrypted content decryption key and uses the content (S20).

It is assumed herein that the user terminal 1 has the encrypted content stored in a storage unit (not shown). In other words, the right-holder terminal 2 encrypts a content and transmits the content to the user terminal 1 beforehand by file transfer or the like. Note that even if the user terminal 1 acquires an encrypted content beforehand, the user terminal 1 cannot decrypt the content without permission information (a content decryption key), and thus cannot use the content.

In the embodiment described above, the user terminal 1 generates the first key pair for an electronic signature including the secret encryption key and the public decryption key, and the second key pair including the secret decryption key and the public encryption key. The user terminal 1 transmits a permission request including the public encryption key of the second key pair after electronically signing the permission request with the secret encryption key of the first key pair. The user terminal 1 acquires a content decryption key from permission information transmitted from a right-holder terminal by using the secret decryption key of the second key pair and uses the content by using the content decryption key. The right-holder terminal 2 includes a key management unit that stores therein the third key pair for an electronic signature including the secret encryption key and the public decryption key and the content decryption key for decryption of the content. The right-holder terminal 2 verifies whether the permission request from the user terminal satisfies a permission condition for the content, and when the permission request satisfies the permission condition, encrypts the content decryption key by using the public encryption key of the second key pair included in the permission request, and transmits permission information including the encrypted content decryption key after electronically signing the permission information with the secret encryption key of the third key pair. The permission request and the permission information are transmitted and received between the user terminal 1 and the right-holder terminal 2 via the blockchain.

In this manner, in the present embodiment, a content itself is not included in the blockchain, but the blockchain is used for transmission and reception of permission information (content decryption key) for decryption of an encrypted content.

Regarding the permission request transmitted by the user terminal 1, the user electronically signs the permission request to ensure, by means of the electronic signature, that the permission request is really issued by the user. Regarding the exchange of the permission information, on the other hand, a content decryption key for an encrypted content needs to be exchanged in a form understandable only by the involved parties: the right holder and the user. Thus, not only the first key pair for an electronic signature, but also the second key pair is needed additionally. More specifically, the user hoping to use a content needs not only the secret encryption key and the public decryption key (the first key pair) for an electronic signature, but also a secret decryption key and a public encryption key (the second key pair) for receiving the permission information. The present embodiment uses these two key pairs to implement the mechanism of managing content permission information by applying the blockchain.

In other words, the present embodiment can apply the blockchain used in transactions of digital virtual currency to content permission management. Specifically, by extension of the blockchain, permission information can be exchanged with credibility assured between the right holder of a content and a user of the content, without needing the centralized management mechanism like the one performed by the conventional DRM (Digital Rights Management) system.

Note that the present invention is not limited to the embodiment described above, and can be changed variously without departing from the gist thereof. For example, the above embodiment illustrates the mechanism for exchanging permission information with credibility assured, not by having a centralized management mechanism, but by utilizing the blockchain. However, irrespective of existence of the blockchain, the mechanism for exchange of permission information using two key pairs can be used as a mechanism for secure exchange of a content decryption key on an unreliable communication channel.

EXPLANATION OF THE REFERENCE NUMERALS 1 user terminal
11 key generation unit
12 key management unit
13 permission request unit
14 content use unit
15 blockchain control unit
16 blockchain
2 right-holder terminal
21 key management unit
22 permission issuance unit
23 permission verification unit
24 blockchain control unit
25 blockchain

The invention claimed is:

1. A permission information management system comprising a user terminal of a user of a content and a right-holder terminal of a right holder of the content, wherein
the user terminal comprises:
a key generation unit that generates a first key pair for an electronic signature including a user secret encryption key and a user public decryption key and a second key pair for acquiring a content decryption key, the second key pair includes a secret decryption key and a public encryption key;
a permission request unit that transmits a permission request including the public encryption key of the second key pair after electronically signing the permission request with the user secret encryption key of the first key pair; and
a content use unit that acquires, from permission information transmitted from the right-holder terminal, the content decryption key by using the secret decryption key of the second key pair, and uses the content by using the content decryption key,
the right-holder terminal comprises:
a key management unit that stores therein a third key pair for an electronic signature including a right-holder secret encryption key and a right-holder public decryption key, and the content decryption key for decryption of the content;
a permission verification unit that verifies whether the permission request satisfies a permission condition for the content; and
a permission issuance unit that, when the permission request satisfies the permission condition, encrypts the content decryption key by using the public encryption key of the second key pair included in the permission request and transmits the permission information, wherein the permission information includes the encrypted content decryption key after electronically signing the permission information with the right-holder secret encryption key of the third key pair, and
the permission request and the permission information are transmitted and received via a blockchain.

2. The permission information management system according to claim 1, wherein
the permission verification unit determines whether a price for the content is properly paid by an amount of digital virtual currency included in the blockchain by which the permission request has been transmitted and received.

3. The permission information management system according to claim 1, wherein
the user terminal comprises a first blockchain control unit that transmits the permission request to the right-holder terminal by broadcasting the permission request to a network, and
the right-holder terminal comprises a second blockchain control unit that transmits the permission information to the user terminal by broadcasting the permission information to the network.

4. A permission information management method performed by a permission information management system including a user terminal of a user of a content and a right-holder terminal of a right holder of the content, the method comprising:
causing the user terminal to
generate a first key pair for an electronic signature including a user secret encryption key and a user public decryption key and a second key pair for acquiring a content decryption key, the second key pair includes a secret decryption key and a public encryption key,
transmit a permission request including the public encryption key of the second key pair after electronically signing the permission request with the user secret encryption key of the first key pair, and
acquire, from permission information transmitted from the right-holder terminal, a content decryption key by using the secret decryption key of the second key pair, and use the content by using the content decryption key; and
causing the right-holder terminal, which comprises a key management unit that stores therein a third key pair for an electronic signature including a right-holder secret encryption key and a right-holder public decryption key and the content decryption key for decryption of the content, to
verify whether the permission request satisfies a permission condition for the content, and
when the permission request satisfies the permission condition, encrypt the content decryption key by using the public encryption key of the second key pair included in the permission request and transmit the permission information, wherein the permission information includes the encrypted content decryption key after electronically signing the permission information with the right-holder secret encryption key of the third key pair, wherein
the permission request and the permission information are transmitted and received via a blockchain.

* * * * *